S. H. GOLDBERG.
ROOFING PRODUCT AND PROCESS OF MAKING SAME.
APPLICATION FILED DEC. 19, 1912.
1,250,578.
Patented Dec. 18, 1917.
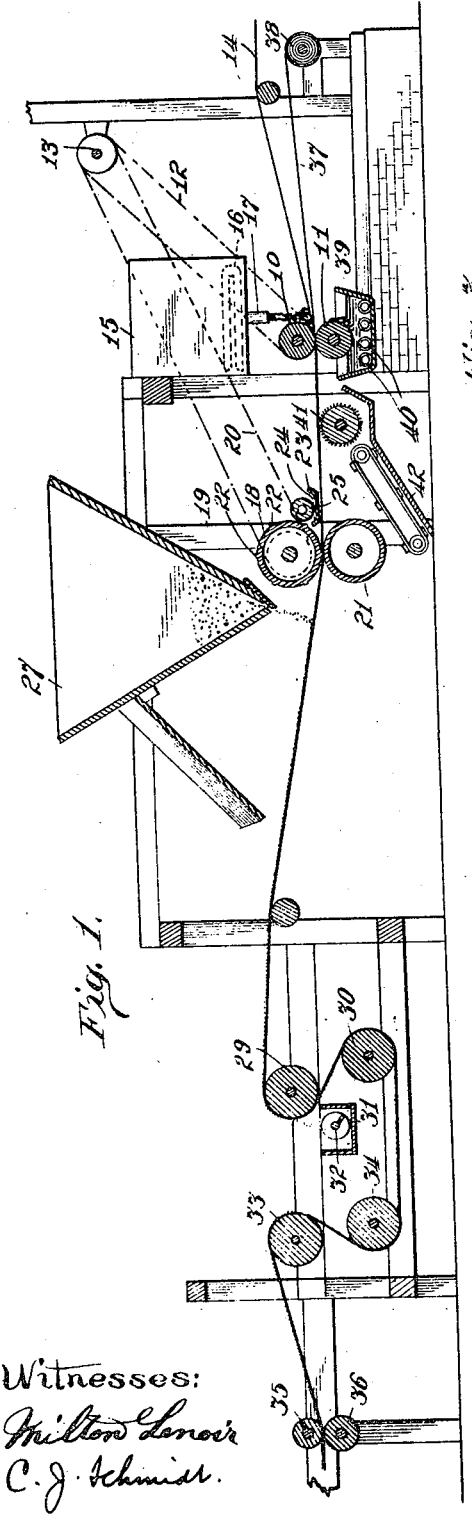
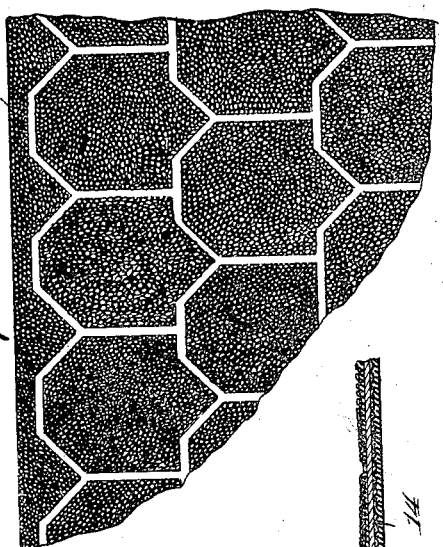
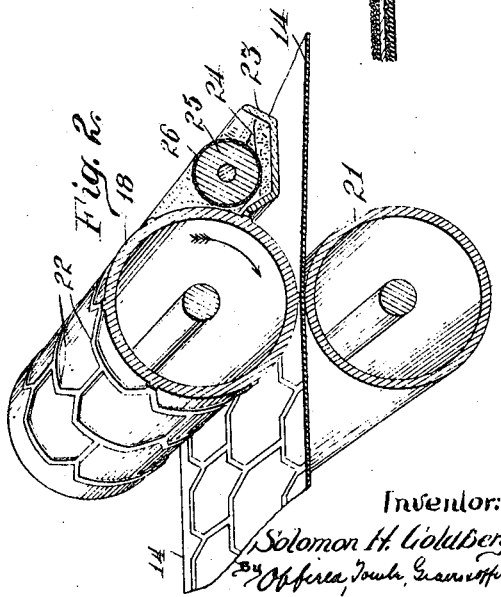
Witnesses:
Milton Lenoir
C. J. Schmidt
Inventor:
Solomon H. Goldberg
By Ohferd, Towh, Grain office
Attorneys

UNITED STATES PATENT OFFICE.

SOLOMON H. GOLDBERG, OF CHICAGO, ILLINOIS.

ROOFING PRODUCT AND PROCESS OF MAKING SAME.

1,250,578.  Specification of Letters Patent.  Patented Dec. 18, 1917.

Application filed December 19, 1912. Serial No. 737,652.

*To all whom it may concern:*

Be it known that I, SOLOMON H. GOLDBERG, of the city of Chicago, in the county of Cook and State of Illinois, have invented certain new and useful Improvements in Roofing Products and Processes of Making Same, of which the following is a specification.

My invention relates to an improved roofing product and process of producing same. The invention relates to flexible roofing material, comprising a length of backing material such as paper, felt or the like treated or saturated with asphaltum or other bituminous compound, to one of whose surfaces a granular surfacing material is applied. The granular material is so applied as to form designs, as for example, an imitation of shingles, tiles or the like. One of the objects of the invention is to apply comminuted granular material to a plurality of fields or areas of the adhesive coated surface, and between these fields or areas to put a second granular material of a different color than the first. The aforesaid granular materials are preferably applied in symmetrically arranged designs and are non-adhesive substances which will adhere to the adhesive asphaltic coating or saturation previously applied to the foundation or backing. The first mentioned fields or areas of granular or comminuted material may be formed by applying to the adhesive asphalt powdered or flaked mica or comminuted graphite or comminuted pumice stone or the like, while the other fields or areas of comminuted non-adhesive material may be sand, gravel or other crushed material but of a different color than the comminuted material forming the first fields or areas.

The first fields or areas may be applied, if desired, by the use of printing rollers as shown in the drawings, in which event if the second fields or areas are applied later, the second granular material will obviously not adhere to the fields or areas which are already covered by the first granular material. It is of course essential that the two fields or areas referred to be of contrasting colors relative to each other in order to get the desired effect.

In the accompanying drawings an apparatus is illustrated showing one way in which the process may be practised and the product produced.

Figure 1 is a side elevational view in vertical section showing the various mechanism links in the chain of operations;

Fig. 2 is an enlarged perspective view of the printing and abutment rolls between which the backing material passes after an application thereto of the adhesive surface;

Fig. 3 is a plan view of a section of the finished product, and Fig. 4 is a sectional view of such product.

Referring to Fig. 1, 10 and 11 represent upper and lower rolls, the upper roll being driven in any suitable manner as by a belt 12 driven from the shaft 13. The body or backing of the roofing material 14 is propelled through these rollers and has a coating of adhesive material applied to its upper surface thereby. This coating material is shown as contained in a tank 15 in which it is heated by steam piping 16, a spout 17 delivering the material to the backing in advance of the upper roll so that as the rolls revolve this coating material is spread uniformly over the backing material so that an even coating results. Adjacent the outlet end of the rolls 10 and 11 and in front of the backing emerging from such rolls is the printing roll 18, this roll being journaled in suitable supporting framework 19, and the roll being driven as by belt 20 passing around a suitable pulley on drive shaft 13. Below this printing roll and below the backing is the abutment roll 21 also journaled in the framework 19. The printing roll has on and about its periphery the embossed or raised lines 22 representative of the outline of a pattern, the raised areas forming in this case outlines of shingles or tiles. Adjacent the printing roll is a trough 23 for containing the non-adhesive material 24 which may be powdered or flaked mica, graphite, pumice stone or any other non-adhesive material. Mounted to revolve in this trough is a roll 25 which dips into the material of the trough and also engages against the outer surfaces of the raised portions of the printing roll in order to apply adhesive substance to such surfaces. In order that the material will better cling to the embossed surfaces, these surfaces may be roughened or otherwise treated and the roll 25 may have a coat 26 of felt or bristles for better carrying the material against the embossing surfaces. When the backing 14 emerges from the rolls 10 and 11 the asphaltic sticky coating which was applied thereto by the rolls will be engaged by the embossed surfaces of the printing roll and the non-adhesive material on these surfaces will be printed or impressed on the sticky surface to form the pattern outlines.

After the first field or areas have been applied to the adhesive surface as described, uncoated fields or areas may then be covered, and while the asphaltic coating is still warm and sticky. Mounted over the backing where it emerges from the printing roll is a hopper 27 for containing sand, gravel, crushed material or the like and this material falls on the backing to progressively cover the entire top surface thereof, but such material will adhere only to the areas surrounded by the non-adhesive pattern or design lines. After receiving the second granular material, the backing travels along a distance until the adhesive coating has cooled and hardened sufficiently, the backing then being given a reverse bend about the upper and lower rollers 29 and 30 in order that the loose material may drop therefrom into the receptacle 31 from which it is conveyed away as by means of a screw 32. The backing then passes about lower and upper rolls 33 and 34 and then between pressure rolls 35 and 36, such pressure rolls forcing the wearing material more intimately into engagement with the sticky areas. After this latter treatment, the finished product may be rolled up into marketable rolls. Fig. 2 shows more in detail the operation and effect of the printing roll mechanism, and Figs. 3 and 4 show sections of the finished product.

It may be desirable to face the lower side of the roofing backing for strengthening purposes, as for example by the application thereto of burlap. Such application may be simultaneously performed with the other steps described above. The strengthening material 37 may be fed from a supplying roll 38 to the under side of the backing to pass therewith between the rolls 10 and 11. Below the roll 11 a trough 39 contains adhesive material such as asphaltum which is heated as by means of steam pipes 40. As the rolls 10 and 11 rotate the material from the pan 39 is carried by the rolls 11 against the under side of the material 37 and is forced through the pores of said material against the under surface of the backing 14, the burlap or other strengthening material then securely and smoothly adhering to the backing. Before the backing 14 with the strengthening material 37 thereon reaches the printing roll, the outer face of the material 37 is preferably treated with some non-adhesive substance in order that it will not stick to the abutment roll. A rotary brush 41 is therefore arranged between the rolls 10 and 11 and the abutment roll 21 for brushing non-adhesive substance against the material 37. This substance may be the same substance that is used for forming the pattern lines, and is contained in a suitable trough 42 into which the brush dips.

The process is not limited to being made by the detail mechanism shown except in so far as any such limitations may be put in the appended claims, and the product is a product as such regardless of the mechanism by which it may be made.

I claim—

1. The process of producing roofing which consists in applying an adhesive coating to backing material, then applying comminuted non-adhesive substance to a plurality of fields or areas of the coated surface, and then applying contrasting surfacing material to the interposed spaces of the coated surface.

2. The process of producing roofing which consists in applying an adhesive coating to backing material, applying comminuted non-adhesive material to a plurality of fields or areas of the coating, and comminuted surfacing of different color to the interposed spaces of the coating, to form designs.

3. The process of producing roofing which consists in propelling lengths of backing material, applying adhesive coating to one side of said backing during propulsion thereof, applying comminuted non-adhesive material to said adhesive coating along lines or areas representative of pattern or design outlines, and applying a contrasting surfacing material to the coating to adhere to the areas thereof not covered by the non-adhesive comminuted material.

4. A process of making prepared roofing, which consists of applying a bituminous adhesive coating to a length of flexible fabric like material, applying comminuted non-adhesive material to a plurality of fields or areas of the coating in symmetrically arranged designs, and applying comminuted non-adhesive material of a different color than the first mentioned material to other fields or areas of the coating.

5. A flexible prepared roofing comprising a fabric like foundation, an adhesive bituminous coating applied to said foundation, comminuted, relatively non-adhesive material of a predetermined color applied to a plurality of fields or areas of the adhesive coating in spaced apart symmetrically arranged designs, and a comminuted relatively non-adhesive granular material of contrasting color applied to other fields or areas of the coated adhesive surface.

6. A flexible prepared roofing comprising a fabric like foundation, an adhesive bituminous coating applied to said foundation, comminuted relatively non-adhesive material of a predetermined color applied in symmetrically arranged designs to spaced fields or areas of the adhesive coating, and comminuted relatively non-adhesive granular material of contrasting color applied to the remaining fields or areas of the coated surface.

7. A flexible prepared roofing comprising a fabric-like foundation, an adhesive coating applied thereto and an exposed facing presenting a plurality of designs in simulation of tiles, or shingles, said designs being formed by contrasting adjacent areas, corresponding areas of one character being formed by granular material of one character applied directly to the adhesive coating and corresponding areas of another character being formed by different granular material applied directly to the adhesive coating.

8. A process of making prepared roofing which consists in applying an adhesive coating to an elongated fibrous sheet, applying comminuted non-adhesive material to predetermined fields or areas in the form of designs, and then applying to other fields or areas non-adhesive comminuted material having an appearance distinctive from the first mentioned material.

In witness whereof, I hereunto subscribe my name this 16th day of December, 1912.

SOLOMON H. GOLDBERG.

Witnesses:
C. J. SCHMIDT,
E. G. INGERSOLL.